United States Patent [19]

Madan et al.

[11] Patent Number: 5,192,594
[45] Date of Patent: Mar. 9, 1993

[54] PROCESS FOR THE PREPARATION OF A POLYURETHANE STRUCTURAL SUPPORT

[75] Inventors: Sanjeev Madan, Corapolis; Hans-Joachim Kogelnik, Pittsburgh, both of Pa.; Majid Daneshvar, Leverkusen, Fed. Rep. of Germany

[73] Assignee: Miles Inc., Pittsburgh, Pa.

[21] Appl. No.: 788,891

[22] Filed: Nov. 7, 1991

[51] Int. Cl.⁵ .............................................. B05D 1/02
[52] U.S. Cl. ................................. 427/421; 427/385.5
[58] Field of Search ............................ 427/421, 385.5

[56] References Cited

U.S. PATENT DOCUMENTS

| | | | |
|---|---|---|---|
| 3,496,058 | 2/1970 | Schroter et al. | 161/119 |
| 3,714,127 | 1/1973 | Fabris et al. | 260/77.5 AM |
| 3,932,360 | 1/1976 | Cerankowski et al. | 260/77.5 AM |
| 3,979,364 | 9/1976 | Rowton | 260/77.5 AM |
| 4,053,545 | 10/1977 | Fay | 264/46.4 |
| 4,444,976 | 4/1984 | Rabito | 528/60 |
| 4,552,934 | 11/1985 | Rabito et al. | 525/458 |
| 4,664,982 | 5/1987 | Genovese et al. | 428/447 |
| 4,695,618 | 9/1987 | Mowrer | 528/55 |
| 4,743,672 | 5/1988 | Goel | 528/44 |
| 4,876,308 | 10/1989 | Melby et al. | 524/780 |

*Primary Examiner*—Bernard Pianalto
*Attorney, Agent, or Firm*—Joseph C. Gil

[57] ABSTRACT

The present invention is directed to a process of preparing a polyurethane structural support by spraying a specific polyurethane onto a substrate. The polyurethane is prepared by reacting a specific polyol blend, an organic diamine, and an isocyanate in the presence of a moisture absorbing material and a polysiloxane defoaming agent.

6 Claims, No Drawings

5,192,594

PROCESS FOR THE PREPARATION OF A POLYURETHANE STRUCTURAL SUPPORT

BACKGROUND OF THE INVENTION

Composite structures produced from metal substrates having a ceramic enamel surface layer and plastic materials are known (see, e.g., U.S. Pat. No. 4,664,982). Typical of the plastic materials used are unsaturated polyester resins, epoxies, polyurethanes, isocyanurates, and nylons. In addition, composites of a wide variety of different substrates with foam materials are known (see, e.g., U.S. Pat. Nos. 3,496,058 and 4,053,545).

Solventless spray systems are also known (see, e.g., U.S. Pat. No. 4,695,618).

Polyurethane elastomers and adhesives having improved sag resistance are known. Such systems are typically cured using a diamine curing agent (see, e.g., U.S. Pat. Nos. 3,714,127, 3,932,360, 3,979,364, 4,444,976, 4,552,934, 4,743,672, and 4,876,308).

A commercially available system for application to a substrate was based upon a reaction mixture of: i) 86.8% by weight of a 455 molecular weight triol formed from propylene oxide and trimethylolpropane, 6.0% by weight of a 28 OH number triol from glycerin, propylene oxide and ethylene oxide (and having 82% primary hydroxyl group content), 2.3% by weight of xylene diamine, 4.7% of a moisture absorbing zeolite, and 0.2% of a tin catalyst, and ii) an isocyanate terminated prepolymer from an isocyanate and a polyether, having an NCO content of 27.4% by weight. The components are mixed at an equivalent ratio of isocyanate groups to isocyanate reactive groups of 1.29. Although this commercial system did meet with some commercial success, blistering and foaming problems were encountered.

DESCRIPTION OF THE INVENTION

The present invention is directed to a process of preparing a polyurethane structural support comprising:

1) applying a reaction mixture onto a substrate, said reaction mixture comprising:
   A) a polyol mixture comprising:
   1) from 50 to 95 parts by weight, and preferably from 80 to 95 parts by weight, of a triol having an OH number of from 200 to 500 and being prepared by reacting propylene oxide with a member selected from the group consisting of glycerin, trimethylolpropane, and mixtures thereof, and
   2) from 5 to 20 parts by weight, and preferably from 5 to 15 parts by weight, of a triol having an OH number of from 20 to 50 and being prepared by reacting propylene oxide and ethylene oxide with a member selected from the group consisting of glycerin, trimethylolpropane, and mixtures thereof, said triol 3) having a primary hydroxyl content of from 50 to 90%,
   3) from 0 to 30 parts by weight of a triglyceride of a fatty acid having an OH number of from 140 to 200, said parts by weight of 1), 2) and 3) totalling 100 parts by weight,
   B) from 1 to 5 parts by weight per 100 parts by weight of component A) of an organic diamine having a molecular weight of from 60 to 2000, and preferably from 100 to 400,
   C) from 1 to 10 parts by weight per 100 parts by weight of component A) of one or more additives to absorb moisture,
   D) from 0 to 2 parts by weight per 100 parts by weight of component A) of one or more catalysts capable of catalyzing the reaction between an isocyanate group and a hydroxyl group,
   E) at least 0.025 parts by weight, and preferably from 0.05 to 1 part by weight, per 100 parts by weight of component A) of one or more polysiloxane defoaming agents,
   F) from 0 to 20 parts by weight per 100 parts by weight of component A) of glass fibers, and
   G) an isocyanate terminate prepolymer prepared by reacting a polyisocyanate with a polyether polyol, said prepolymer having an NCO content of from 18 to 35% by weight,
   at an equivalent ratio of isocyanate groups to isocyanate reactive groups of from 0.70:1 to 1.2:1, and preferably from 0.90:1 to 1.09:1, and
2) allowing said reaction mixture to fully react.

The lower index of the system reduces the amount of excess isocyanate groups thereby reducing the possibility of further reaction of the isocyanate groups with water and/or moisture, which could lead to blistering. In addition, the presence of the polysiloxane defoaming agent allows air to escape, renders the system denser, and lowers the possibility of isocyanate-water reaction, which could lead to foaming.

All of the various reactants are known in the polyurethane art. The isocyanates useful as starting components for the production of the polyurethanes of the present invention are isocyanate terminated prepolymers having isocyanate group contents of from 18 to 35% by weight. The prepolymers are prepared by reacting a polyisocyanate with a polyether polyol. Useful polyether polyols include substantially any of the polyethers generally used in the polyurethane art. Preferred are polyethers having hydroxyl functionalities of from 2 to 6, having OH numbers of from 20 to 700, and having primary hydroxyl group contents of from 0 to 100%. The most preferred polyethers have molecular weights of from 200 to 8000. Useful isocyanates include substantially any polyisocyanate. Preferred are polymethylene poly(phenyl isocyanates). These isocyanates are generally known and are produced by reacting phosgene with aniline/formaldehyde condensates. Known processes for preparing the aniline/formaldehyde condensates and the resultant polyisocyanates are described in the literature and in many patents, for example, U.S. Pat. Nos. 2,638,730, 2,950,263, 3,012,008, 3,344,162 and 3,362,979. Additionally useful isocyanates are described in U.S. Pat. No. 4,256,849, the disclosure of which is herein incorporated by reference.

The starting components used for the production of the polyurethanes of the present invention also include a variety of active hydrogen group containing compounds. More particularly, the active hydrogen containing compounds include certain specific polyols and certain specific diamines.

The polyols useful herein include:
1) triols having OH numbers of from 200 to 500 and being prepared by reacting propylene oxide with a member selected from the group consisting of glycerin, trimethylolpropane, and mixtures thereof, and
2) triols having OH numbers of from 20 to 50 and primary hydroxyl group contents of from 50 to 90%, and being prepared by reacting propylene oxide and ethylene oxide with a member selected from the group consisting of glycerin, trimethylolpropane, and mixtures thereof.

The hydroxyl compounds useful in producing the polyurethane are generally known in the polyurethane art. All that is necessary is that the molecular weights and amounts of materials be as noted above. Such compounds are polyethers containing three hydroxyl groups, such as those known for the production of polyurethanes.

They are prepared by the addition reaction of ethylene oxide (in the case of triol 2) and propylene oxide to i) glycerin, trimethylolpropane, and mixtures thereof.

Representatives of the various hydroxyl group containing compounds which may be used according to the present invention have been described, e.g. in High Polymers, Vol. XVI, "Polyurethanes, Chemistry and Technology", by Saunders-Frisch, Interscience Publishers, New York, London, Volume I, 1962, pages 32-42 and pages 44-54 and Volume II, 1964, pages 5-6 and 198-199 and in Kunststoff-Handbuch, Volume VII, Vieweg-Hochtlen, Carl-Hanser-Verlag, Munich, 1966, e.g. on pages 45 to 71. The only essential requirement in selecting the particular hydroxyl compound for the elastomer production is that the hydroxyl number and amount limitations set forth above be observed. It is only in using these narrow ranges of hydroxyl compounds that the elastomers of the present invention can be obtained.

Component B) of the reaction mixture useful herein is an organic diamine having a molecular weight of from 60 to 2000, and preferably from 100 to 400. Substantially any organic diamine can be used. Particularly preferred are diamines of the following general formula:

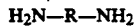

$H_2N-R-NH_2$ where R is a $C_3$ to $C_{10}$ straight or branched alkylene group, a $C_4$ to $C_{15}$ alicyclic group, or a $C_6$ to $C_{25}$ arylene group. Useful diamines include the various straight and branched chain isomers of diaminopropane, diaminobutane, diaminopentane, diaminohexane, diaminoheptane, diaminooctane, diaminononane, and diaminodecane. Specific useful diamines include 1,2- and 1,3-diaminopropane; 1,3-, 2,3-, and 1,4-diaminobutane; 1,2-diamino-2-methylpropane; 1,5-diaminoentane; 1,4-diamino-1-methylbutane; 1,4-diamino-2-methylbutane; 1,3-diamino-1-ethyl propane; 1,3-diamino-1,1-dimethylpropane; 1,3-diamino-1,2-dimethylpropane; 1,3-diamino-2,2-dimethylpropane; 1,5-diamino-2-methylpentane; 1,6-diaminohexane and the like. Useful alicyclic diamines include the various isomers of diaminocyclobutane, diaminocyclopentane, diaminocyclohexane, diaminocycloheptane, diaminocyclooctane, and diaminocyclononane. Also useful are the diamino-1-methylcyclohexanes; the methylenebis(cyclohexylamines); the diamino-1-methylcyclopentanes; the diaminodimethylcyclohexanes; isophorone diamine; and the like.

Also useful herein are the various known aromatic diamines used in the polyurethane art. Such amines include meta-xylene diamine, phenylene diamine, methylenebis(phenyl amine) and diethyltoluene diamine. Also useful are the various aromatic diamines described in U.S. Pat. No. 4,218,543, the disclosure of which is herein incorporated by reference. Also useful are the polyoxyalkylene diamines sold under the Jeffamine trademark by Texaco. Also useful are the aminocrotonate amino terminated polyethers described in U.S. application Ser. No. 07/523,769 (filed on May 15, 1990), 07/524,268 (filed on May 15, 1990) and 07/562,293 (filed on Aug. 3, 1990). The presently preferred diamine is meta-xylene diamine.

Catalysts are also frequently used according to the invention. The catalysts added are generally known and include tertiary amines such as triethylamine, tributylamine, N-methylmorpholine, N-ethylmorpholine, N-cocomorpholine, N,N,N',N'-tetramethyl-ethylene-diamine, 1,4-diaza-bicyclo(2,2,2)-octane, N-methyl-N'-dimethyl-aminoethylpiperazine, N,N-dimethylbenzylamine, bis-(N,N-diethyl-aminoethyl)-adipate, N,N-diethylbenzylamine, pentamethyl-diethylenetriamine, N,N-diemthylcyclohexylamine, N,N,N',N'-tetramethyl-1,3-butanediamine, N,N-dimethyl-β-phenylethylamine, 1,2-dimethyl imidazole, 2-methyl imidazole and the like. Also useful are the commercially available tertiary amines such as Niax A1 and Niax A107, available from Union Carbide; Thancat DD, available from Texaco; and the like. Mannich bases known per se obtained from secondary amines such as dimethylamine and aldehydes, preferably formaldehyde, or ketones such as acetone, methyl ethyl ketone or cyclohexanone and phenols such as phenol, nonylphenol or bisphenol may also be used as catalysts. Examples of catalysts which consist of tertiary amines having hydrogen atoms which are reactive with isocyanate groups include triethanolamine, triisopropanolamine, N-methyldiethanolamine, N-ethyl-diethanol amine, N,N-dimethylethanol amine and their reaction products with alkylene oxides such as propylene oxide and/or ethylene oxide. Silaamines having carbon-silicon bonds as described, e.g., in German Patent No. 1,229,290 and U.S. Pat. No. 3,620,984 may also be used as catalysts. Examples include 2,2,4-trimethyl-2-silamorpholine and 1,3-diethylaminoethyl-tetramethyldisiloxane. Basic nitrogen compounds such as tetraalkylammonium-hydroxides, alkali metal hydroxides such as sodium phenolate and alkali metal alcoholates such as sodium methylate may also be used as catalysts. Hexahydrotriazines are also suitable catalysts. Organic metal compounds may also be used as catalysts according to the invention, in particular organic tin and bismuth compounds. The organic tin compounds used are preferably tin(II) salts of carboxylic acids such as tin(II) acetate, tin(II) octoate, tin(II) ethyl hexoate and tin(II) laurate and tin(IV) compounds such as dibutyl tin oxide, dibutyl tin dichloride, dibutyl tin diacetate, dibutyl tin dilaurate, dibutyl tin maleate or dioctyl tin diacetate. Useful bismuth compounds include bismuth neodecanoate, bismuth versalate, and various bismuth carboxylates. All the above-mentioned catalysts may, of course, be used as mixtures.

Further examples of catalysts which may be used according to the invention and details concerning the activity of the catalysts are known and are described, e.g., in Kunststoff-Handbuch, Volume VII, published by Vieweg and Hochtlen, Carl-Hanser-Verlag, Munich 1966, pages 96 to 102.

The moisture absorbing materials useful herein are known and are described in U.S. Pat. No. 3,755,222, and U.S. Pat. No. 4,695,618, the disclosures of which are herein incorporated by reference.

The polysiloxane defoaming agents are generally known in the coating art. Several types are commercially available. The presently preferred antifoaming agents are Foamex N and Foamex 3062, both available from Tego Chemie Service U.S.A.; AF 9000, available from General Electric; and Aqua Par-157, available from Akzo Chemicals Inc.

Surface active additives such as emulsifiers and foam stabilizers may also be used according to the invention. Suitable emulsifiers include, e.g., the sodium salts of ricinoleic sulphonates or salts of fatty acids with amines such as oleic acid diethylamine or stearic acid diethanolamine. Alkali metal or ammonium salts of sulphonic acids such as dodecyl benzene sulphonic acid or dinaphthylmethane disulphonic acid or of fatty acids such as ricinoleic acid or of polymeric fatty acids may also be used as surface active additives.

According to the invention, the components may be reacted together by known processes often using mechanical devices such as those described in U.S. Pat. No. 2,764,565. Details concerning processing apparatus which may be used according to the invention may be found in Kunststoff-Handbuch, Volume VII, published by Vieweg and Hochtlen, Carl-Hanser-Verlag, Munich, 1966, pages 121 and 205.

The invention is further illustrated but is not intended to be limited by the following examples in which all parts and percentages are by weight unless otherwise specified.

In the working examples which follow, the following materials were used:

PREPOLYMER: an isocyanate terminated prepolymer having an isocyanate group content of 27.4%, and being prepared by reacting a) Mondur MR (a commercially available polymethylene polyphenyl polyisocyanate sold by Mobay Corporation, having an equivalent weight of about 133, and an isocyanate group content of 32.1%) with b) a glycerin/propylene oxide/ethylene oxide adduct (weight ratio of propylene oxide to ethylene oxide of about 5:1) having a primary OH group content of about 82% and an OH number of 28; PREPOLYMER has a viscosity of 610 cps at 25° C.;

POLYOL A: a trimethylolpropane/propylene oxide adduct having an OH number of 370;

POLYOL B: a glycerin/propylene oxide/ethylene oxide adduct (weight ratio of propylene oxide to ethylene oxide of about 5:1) having a primary OH group content of about 82% and an OH number of 28;

XDA: meta-xylene diamine

BAYLITH: a commercially available zeolite from Mobay Corporation known as Baylith L Powder;

FOAMEX N a commercially available defoamer concentrate which is a dimethyl polysiloxane in combination with dispersed silicic acid, sold by Tego Chemie Service U.S.A. under the designation Tego Foamex N;

COSCAT 83 a bismuth carboxylate, commercially available from Cosan Chemical Corporation;

In each example, the acrylic sheet used was a clear extruded acrylic sheet having a thickness of 1/16 of an inch, manufactured by Plaskolite Inc., and sold under the Optix trademark.

The tests reported in the examples were density (ASTM D-792), tensile strength and elongation (both ASTM D-412), and flex modulus (ASTM D-790).

EXAMPLE 1

Into a drum were added 8676 parts of Polyol A, 600 parts of POLYOL B, and 229 parts of XDA. The mixture was mixed for 10 minutes. 476 parts of BAYLITH were then added and the mixture mixed for an additional 15 minutes. 10 parts of FOAMEX N were then added. Finally, 24 parts of COSCAT 83 were added. The total blend ("component B") was then mixed for 15 minutes.

Component B and PREPOLYMER were mixed in a spray gun with a static mixer using spray equipment equipped with a metering pump and sprayed as a backing onto the acrylic sheet, at a ratio of 3 parts of PREPOLYMER to 4 parts component B, and at a temperature of 60° C. (spray pressure of approximately 10 MPa or 1500 psi). The isocyanate index of the system was about 0.96.

The backing formed a 2 mm thick layer, which was tackfree in 15 seconds. The density of the sample was 1.16 gm/cc. The acrylic sheet with the polyurethane backing was subjected to a thermal shock by placing it in an oven at 100° C. for 2 hours. This was repeated after storing at 25° c. for two weeks. No blistering or foaming was observed.

The backing without the acrylic sheet was tested to determine its physical properties. The following properties were obtained:

| Tensile strength, psi | 6100 |
|---|---|
| Elongation, % | 6 |
| Flex Modulus, psi | 250,900 |

EXAMPLE 2

Into a drum were added 8676 parts of POLYOL A, 600 parts of POLYOL B, and 229 parts of XDA. The mixture was mixed for 10 minutes. 476 parts of BAYLITH were then added and the mixture mixed for an additional 15 minutes. To this were added 10 parts of FOAMEX N. Finally, 24 parts of COSCAT 83 were added and the total blend ("component B") was mixed for 15 minutes.

Component B and PREPOLYMER were mixed in a spray gun with a static mixer, using spray equipment equipped with a metering pump, and sprayed as a backing onto the acrylic sheet, at a ratio of 3 parts of PREPOLYMER to 4 parts of component B, and at a temperature of 60° C. (spray pressure of approximately 10 MPa or 1500 psi). During spraying a chopper attached to the top of the spray gun added ¼" chopped glass to the polyurethane stream. The total amount of chopped glass was 8% by weight of the final cured sample.

The backing formed a 4 mm thick layer, which was tackfree in 15 seconds. The acrylic sheet with the polyurethane backing was subjected to a thermal shock by placing it in an oven at 100° C. for 2 hours. This was repeated after storing at 25° C. for two weeks. No blistering or foaming was observed.

The backing without the acrylic sheet was tested to determine its physical properties. The following properties were obtained:

| Tensile strength, psi | 7500 |
|---|---|
| Elongation, % | 4 |
| Flex Modulus, psi | 375,000 |

EXAMPLE 3

Into a drum were added 6771 parts of POLYOL A, 600 parts of POLYOL B, 1905 parts of a castor oil (DB Oil, available from Caschem Inc; the castor oil was added to enhance water resistance) and 229 parts of XDA. The mixture was mixed for 10 minutes. 476 parts of BAYLITH were then added and the mixture mixed for an additional 15 minutes. 10 parts of FOAMEX N and then 24 parts of COSCAT 83 were added. The total blend ("component B") was then mixed for 15 minutes.

Components B and PREPOLYMER were mixed in a spray gun with a static mixer using spray equipment equipped with a metering pump and sprayed as a backing onto the clear acrylic sheet, at a ratio of 3 parts of PREPOLYMER to 4 parts of component B, and at a temperature of 60° C. (spray pressure of approximately 1000 psi). The isocyanate index of the system was about 1.09.

The backing formed a 2 mm thick layer, which was tackfree in 15 seconds. The acrylic sheet with the polyurethane backing was subjected to a thermal shock by placing it in an oven at 100° C. for 2 hours. This was repeated after storing at 25° C. for two weeks. No blistering or foaming was observed.

The backing without the acrylic sheet was tested to determine its physical properties. The following properties were obtained:

| | |
|---|---|
| Tensile strength, psi | 6500 |
| Elongation, % | 5 |
| Flex Modulus, psi | 270,900 |

EXAMPLE 4

A comparative study was done to observe the effect of the level of the antifoaming agent.

Into a drum were added 8676 parts of POLYOL A, 600 parts of POLYOL B, and 229 parts of XDA. The mixture was mixed for 10 minutes. 476 parts of BAYLITH were then added and the mixture mixed for a further 15 minutes. To this was added 'X' parts of FOAMEX N, as shown in the table below and then 24 parts of COSCAT 83. The total blend ("component B") was then mixed for 15 minutes.

Component B and PREPOLYMER were mixed in a spray gun with a static mixer using spray equipment equipped with a metering pump and sprayed as a backing onto the clear acrylic sheet, at a ratio of 3 parts of PREPOLYMER to 4 parts of component B, and at a temperature of 60° C. (spray pressure of approximately 10 MPa or 1500 psi). The isocyanate index of the system was about 0.96. The surrounding environment during spraying was at a dewpoint of 68° F.

The backing formed a 2 mm thick layer, which was tackfree in 15 seconds. The acrylic sheet with the polyurethane backing was subjected to a thermal shock by placing it in an oven at 100° C. for 2 hours. This was repeated after storing at 25° C. for two weeks. The results are shown below:

| 'X' parts of antifoaming agent | Comments |
|---|---|
| No antifoaming agent | Blistered. Density 1.09 g/cc. |
| 1 part | No blisters but slight debonding between acrylic and polyurethane. |
| 2.5 parts | No change. Density 1.14 g/cc. |
| 10 parts | No change. Density 1.16 g/cc. |
| 100 parts | No change. |

EXAMPLE 5

The commercially available system set forth on page 1 of this application was tested. 0.075% by weight, based on the weight of the polyols, of a polysiloxane anti-foaming agent was added to the component i). The components i) and ii) were then sprayed at an isocyanate index of 1.29 onto the back of the clear acrylic sheet. The backing formed a 2 mm thick layer. The sheet with backing was placed in an oven at 100° C. for 2 hours. Blisters formed throughout the acrylic sheet.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process of preparing a polyurethane structural support comprising:
  1) spraying a reaction mixture onto a substrate, said reaction mixture comprising:
    A) a polyol mixture comprising:
      1) from 50 to 95 parts by weight of a triol having an OH number of from 200 to 500 and being prepared by reacting propylene oxide with a member selected from the group consisting of glycerin, trimethylolpropane, and mixtures thereof, and
      2) from 5 to 20 parts by weight of a triol having an OH number of from 20 to 50 and being prepared by reacting propylene oxide and ethylene oxide with a member selected from the group consisting of glycerin, trimethylolpropane, and mixtures thereof, said triol 3) having a primary hydroxyl content of from 50 to 90%,
      3) from 0 to 30 parts by weight of a triglyceride of a fatty acid having an OH number of from 140 to 200, said parts by weight of 1), 2) and 3) totalling 100 parts by weight,
    B) from 1 to 5 parts by weight per 100 parts by weight of component A) of an organic diamine having a molecular weight of from 60 to 2000,
    C) from 1 to 10 parts by weight per 100 parts by weight of component A) of one or more additives to absorb moisture,
    D) from 0 to 2 parts by weight per 100 parts by weight of component A) of one or more catalysts capable of catalyzing the reaction between an isocyanate group and a hydroxyl group,
    E) at least 0.025 parts by weight per 100 parts by weight of component A) of one or more polysiloxane defoaming agents,
    F) from 0 to 20 parts by weight per 100 parts by weight of component A) of glass fibers, and
    G) an isocyanate terminated prepolymer prepared by reacting a polyisocyanate with a polyether polyol, said prepolymer having an NCO content of from 18 to 35% by weight, at an equivalent ratio of isocyanate groups to isocyanate reactive groups of from 0.70:1 to 1.2:1, and 2) allowing said reaction mixture to fully react.

2. The process of claim 1, wherein component A)1) comprises from 80 to 95 parts by weight, and component A)2) comprises from 5 to 15 parts by weight, and component E) comprises from 0.05 to 1.0 parts by weight.

3. The process of claim 1, wherein said organic diamine has a molecular weight of from 100 to 400.

4. The process of claim 3, wherein said organic diamine is an aromatic diamine.

5. The process of claim 4, wherein said diamine is meta-xylene diamine.

6. The process of claim 3, wherein said equivalent ratio is from 0.90:1 to 1.09:1.

* * * * *